US005628609A

United States Patent [19]
Nespor

[11] Patent Number: 5,628,609
[45] Date of Patent: May 13, 1997

[54] WHEEL LIFT VEHICLE LIFTING AND TOWING DEVICE

[75] Inventor: Ronald B. Nespor, Mercer, Pa.

[73] Assignee: Chevron, Inc., Mercer, Pa.

[21] Appl. No.: 628,510

[22] Filed: Apr. 5, 1996

[51] Int. Cl.$^6$ ...................................................... B60P 3/12
[52] U.S. Cl. .......................... 414/563; 280/402; 403/327; 403/234
[58] Field of Search ...................... 414/426–430, 414/563; 280/402; 403/327, 233, 234

[56] References Cited

U.S. PATENT DOCUMENTS

| 4,564,207 | 1/1986 | Russ et al. | 280/402 |
| 4,637,623 | 1/1987 | Bubik | 280/402 |
| 4,741,661 | 5/1988 | Carey | 414/563 |
| 4,836,737 | 6/1989 | Holmes et al. | 414/563 |
| 4,859,134 | 8/1989 | Lock | 414/563 |
| 4,871,291 | 10/1989 | Moore et al. | 414/563 |
| 4,904,146 | 2/1990 | Lock et al. | 414/563 |
| 4,927,315 | 5/1990 | Nespor | 414/563 |
| 4,968,052 | 11/1990 | Alm et al. | 280/402 |
| 4,986,720 | 1/1991 | Holmes et al. | 414/563 |
| 5,350,271 | 9/1994 | Weller | 414/563 |
| 5,352,083 | 10/1994 | Roberts et al. | 414/477 |

FOREIGN PATENT DOCUMENTS

| 56-51647 | 5/1981 | Japan . |
| 895691 | 5/1962 | United Kingdom . |

OTHER PUBLICATIONS

"Century's F–A" Brochure of Apr. 1995, 2 pages.

Primary Examiner—Karen B. Merritt
Assistant Examiner—Stephen Gordon
Attorney, Agent, or Firm—Fay, Sharpe, Beall, Fagan, Minnich & McKee

[57] ABSTRACT

A wheel lift vehicle lifting and towing device includes a boom mounted to a towing vehicle and having a cross bar connected to its rear end. A wheel retainer assembly mounted to each end of the cross bar includes a wheel grid having a transversely adjustable wheel chock. A wheel retainer arm is horizontally rotatably mounted above an outer end of the wheel grid and has a wheel retainer member mounted at its outer end which cooperates with the wheel chock to retain a wheel.

11 Claims, 4 Drawing Sheets

WHEEL LIFT VEHICLE LIFTING AND TOWING DEVICE

BACKGROUND OF THE INVENTION

1. Field of the Invention

The present invention relates to a wheel lift type vehicle lifting and towing device and, more particularly, to such a device having an improved wheel retainer assembly.

2. Description of the Related Art

With the current designs of automobiles, it is no longer possible to lift most of such vehicles with a conventional winch and a cable having a hook at its end without damaging the vehicle. Accordingly wheel lift types of lifting and towing devices wherein a vehicle is lifted by engaging its wheels with some form of wheel retaining assembly have become common and well known in the art.

While such prior wheel lift types of lifting and towing devices generally have been satisfactory, they nevertheless have been found to have certain disadvantages. In many such prior art devices, the wheel receiving or retaining assemblies have removable arms which must be physically connected for lifting and towing and physically disconnected for storage. This is time consuming, cumbersome and requires heavy lifting and handling. Other such prior art devices are not easily adjustable to fit wheels of different sizes or vehicles of different track widths. Still other such prior art devices do not readily secure the wheels of a vehicle.

SUMMARY OF THE INVENTION

It is an object of the present invention to provide an improved wheel lift type of vehicle lifting and towing device having a wheel retainer assembly which includes a wheel retainer arm rotatable from a storage position to a wheel retaining position while still remaining fixedly attached to the assembly.

It is another object of the present invention to provide an improved wheel lift type of vehicle lifting and towing device which is readily adjustable to fit wheels of different sizes and vehicles of different track widths.

It is still another object of the present invention to provide an improved wheel lift type of vehicle lifting and towing device having a wheel retainer assembly which includes an easily removable wheel retainer pan.

The present invention achieves the above and other objects by providing a wheel lift vehicle lifting and towing device for attachment to the rear of a towing vehicle. The wheel lift apparatus includes an extensible boom pivotally mounted to the vehicle and a cross bar pivotally attached to the rear end of the boom. A wheel retainer assembly is mounted to each end of the cross bar. Each wheel retainer assembly includes a laterally adjustable wheel grid mounted on an end of the cross bar. The wheel grid further includes a transversely adjustable wheel chock. A wheel retainer arm is mounted adjacent a first end thereof to an outer end of the wheel grid in a manner whereby the wheel retainer arm is locked to the wheel grid while still being rotatable relative thereto. The wheel retainer arm is rotatable outwardly from a storage position parallel to and in front of the cross bar to a transverse wheel retaining position adjacent the outside of a vehicle wheel. A removable wheel retaining member is mounted adjacent a second end of the wheel retainer arm and cooperates with the wheel chock to retain a wheel therebetween.

These, together with other objects and advantages which will be subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENTS

Figure 1:
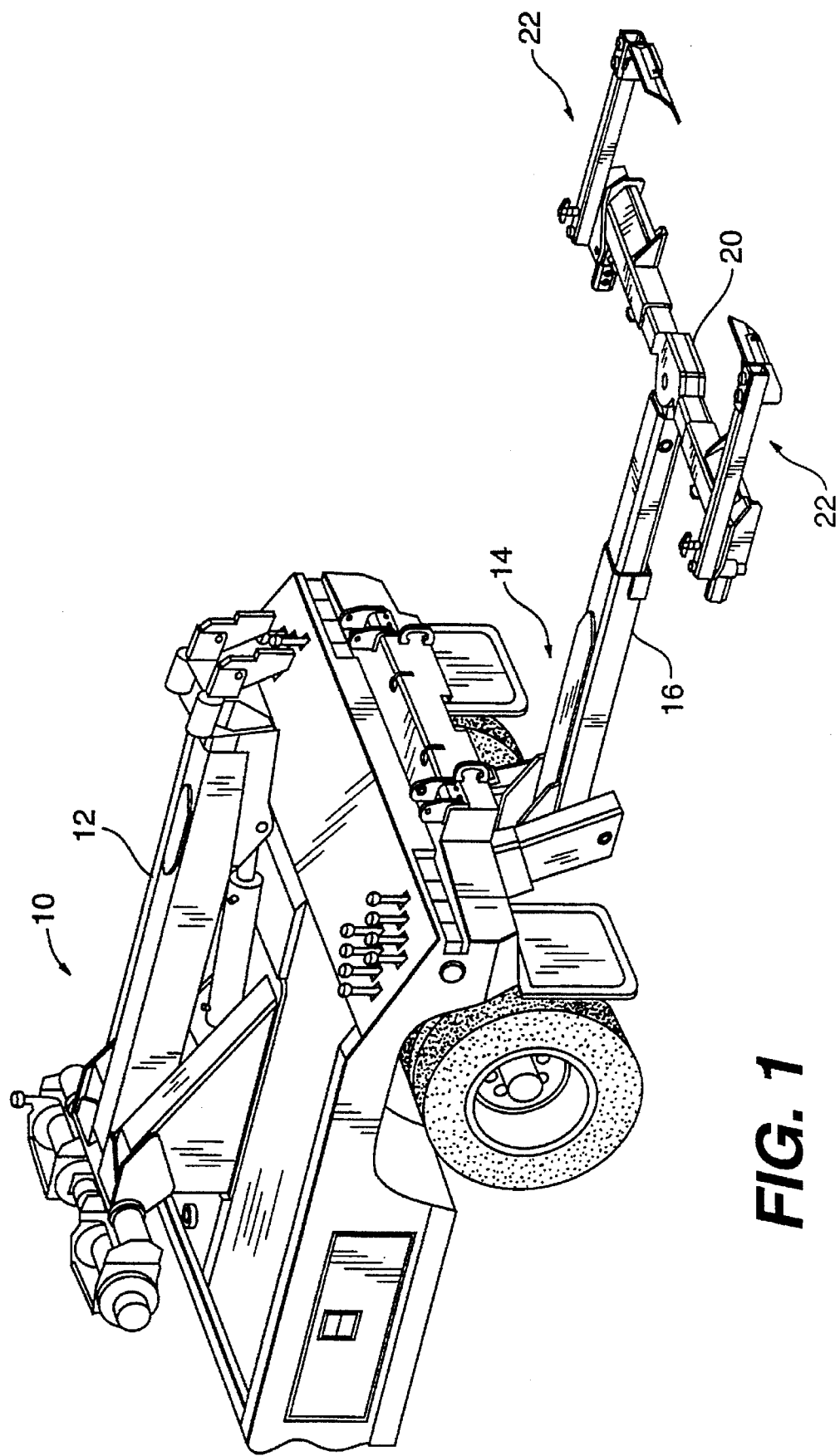
FIG. 1 is a perspective view of the rear of a tow truck provided with a wheel lift vehicle lifting and towing device according to the present invention and showing the device extending outwardly from the tow truck.

Referring to the drawings, shown in FIG. 1 is a towing vehicle or truck 10 having a conventional crane or hoist 12 pivotally mounted to the back top portion of the truck and which may be raised and lowered. Attached to the understructure of the body of the tow truck adjacent the rear end thereof is a wheel lift vehicle lifting and towing device according to the present invention, generally indicated by the numeral 14. In FIG. 1 the wheel lift device is shown with an extensible boom 16 in a downward extended position. When in a retracted storage position (not shown), the back portion of the wheel lift device abuts the rear end of the truck with the boom 16 being retracted under the understructure of the truck.

Referring to FIGS. 2 through 6, the wheel lift device 14 includes a cross bar 20 pivotally attached to the end of the boom 16. Slidably mounted on each end of the cross bar is a wheel retainer assembly, each generally indicated by the numeral 22.

Figure 4:
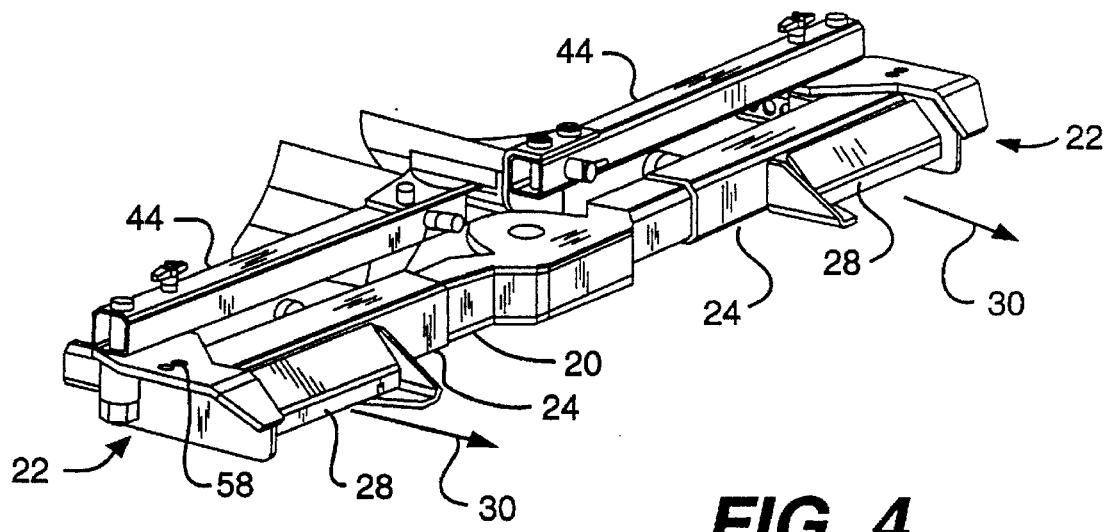
FIG. 4 is a perspective view of the wheel lift device of the present invention showing the wheel retainer arms in a storage position.
Figure 5:
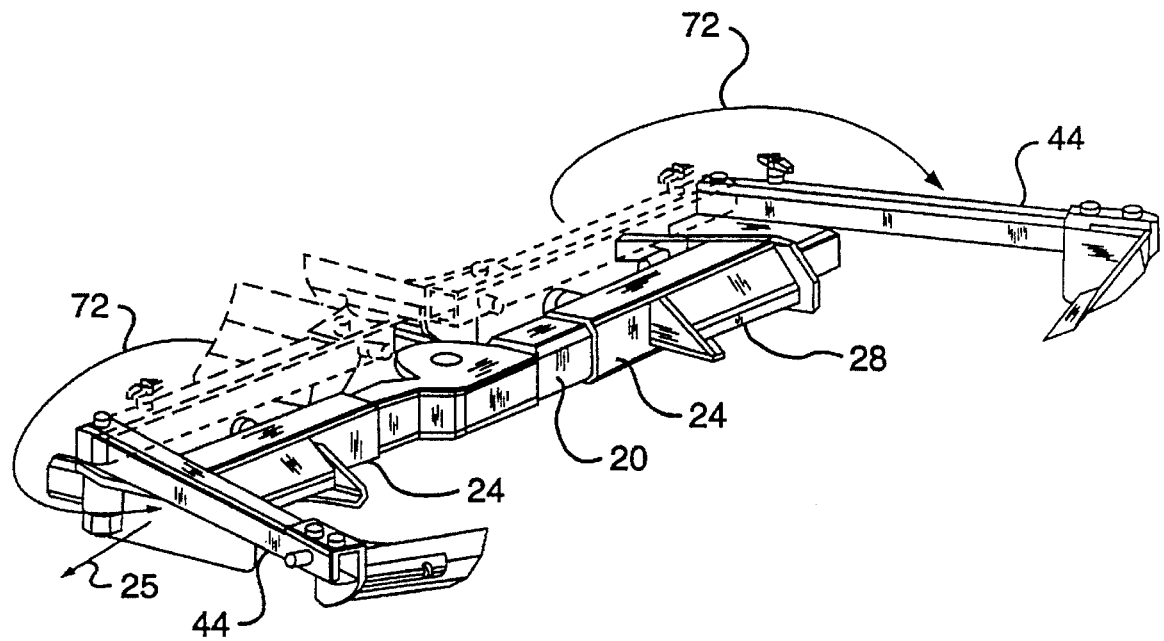
FIG. 5 is a perspective view of the wheel left device showing the wheel retainer arms rotated to a wheel approach position.

Each wheel retainer assembly includes a wheel grid 24 laterally adjustable along the length of one end of the cross bar 20 as shown by the arrow 25 in FIG. 5. The wheel grid may be locked in position by a threaded pin 26 which fictionally engages the cross bar to lock the wheel grid in a desired position. The wheel grid 24 includes a transversely adjustable wheel chock 28 as an integral part thereof. The wheel chock is movable in the direction of arrow 30 shown in FIG. 4.

Figure 2:
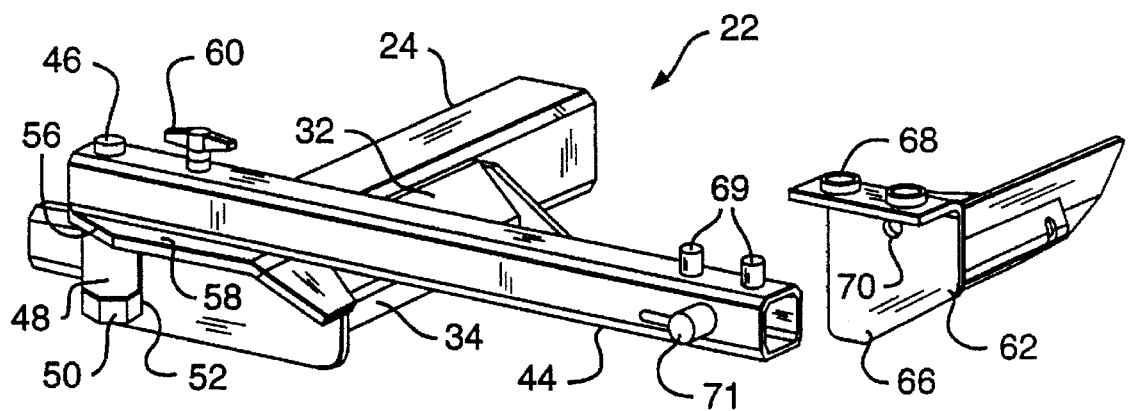
FIG. 2 is a perspective view from the left rear side of a wheel retainer assembly of the present invention showing the wheel pan disconnected from the end of the wheel retaining arm.
Figure 3:
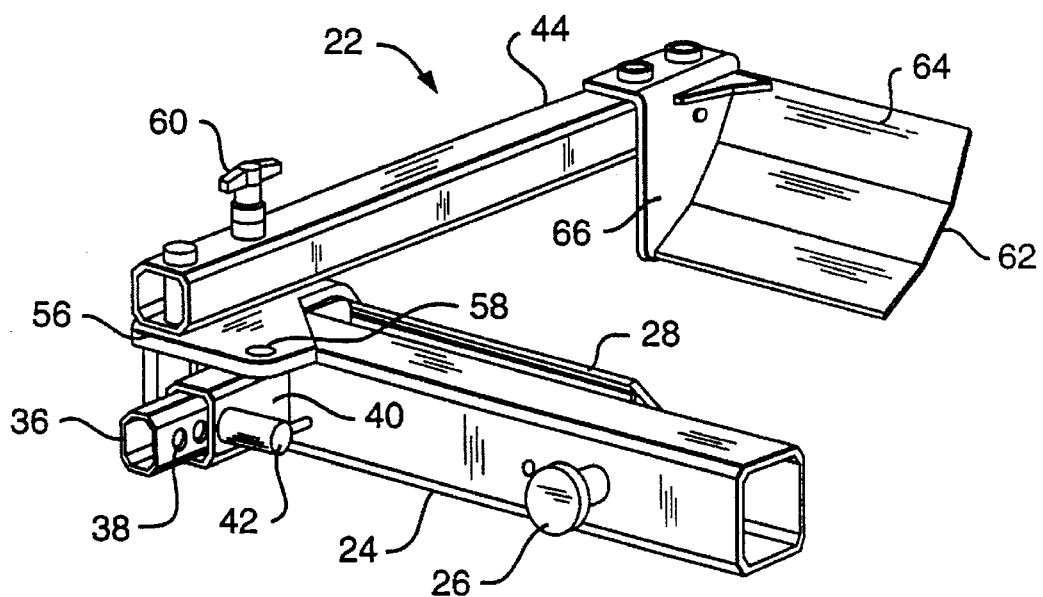
FIG. 3 is a perspective view from the right front side of a wheel retainer assembly showing the wheel pan attached to the wheel retainer arm.

The wheel chock includes an angled rear face 32 for contacting a wheel and a rear vertical face 34 as shown in FIG. 2. Extending forwardly from the rear face is a tubular arm 36 having positioning holes 38 therein as shown in FIG. 3. Tubular arm 36 is slidably received in rectangular hollow tube 40 of the wheel grid. A cam pin 42 normally spring biased to an extended position is mounted on tube 40 and extends therethrough to engage one of the holes 38 to lock the wheel chock in a desired position to fit a specific sized wheel. Preferably the wheel chock is capable of adjusting to wheel sizes ranging from 21 to 32 inches in diameter. When the wheel chock is fully retracted, the wheel retainer assembly fits large wheels, and when the wheel chock is fully extended, the wheel retainer assembly fits small wheels. The middle chock adjustments accommodate mid sized wheels.

Figure 6:
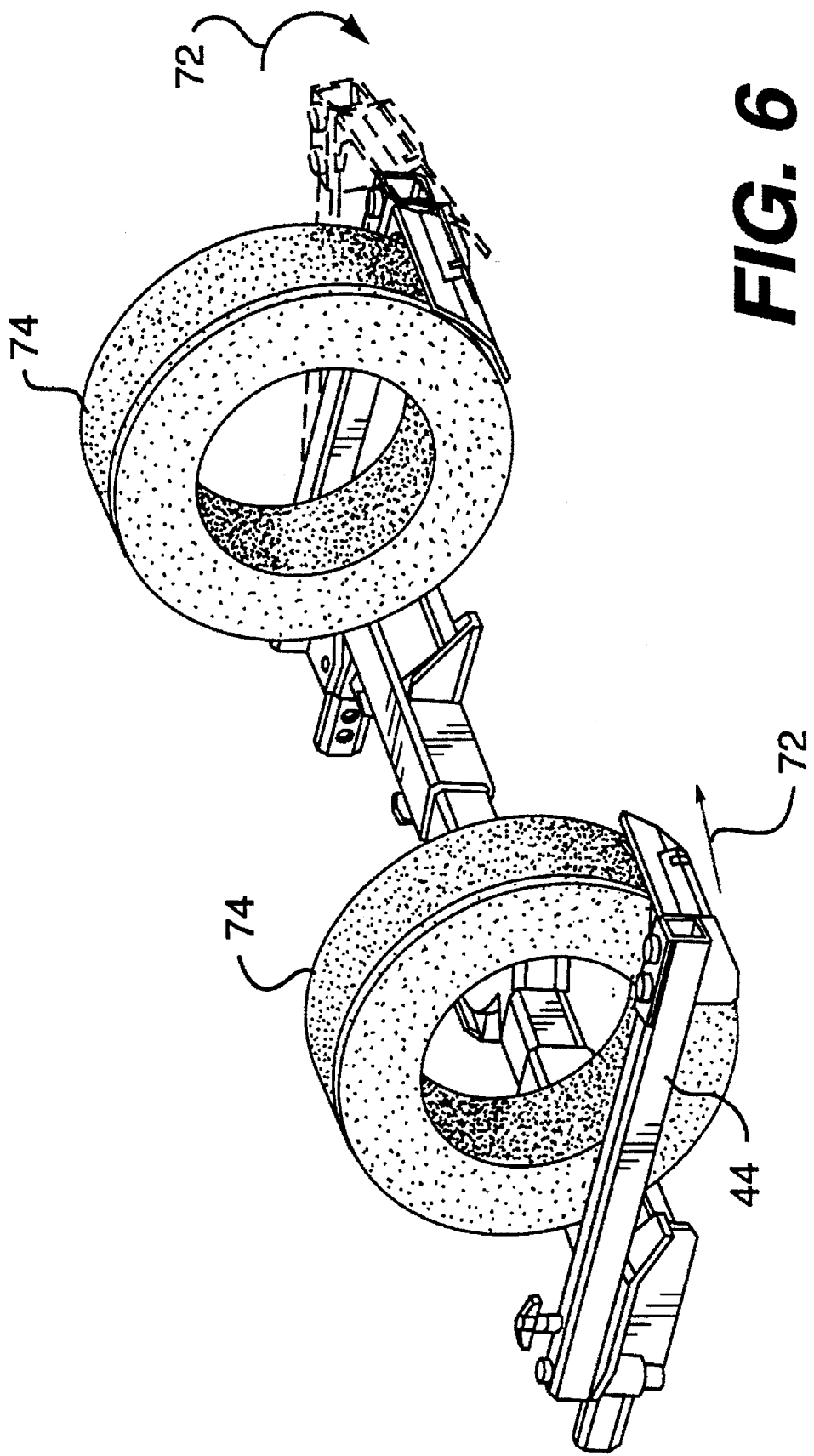
FIG. 6 is a perspective view of the wheel lift device showing the wheel retaining arms in a wheel retaining position retaining a pair of wheels.

The wheel retainer assembly further includes a rotatable wheel retainer arm 44 fixedly connected to an outer end of the wheel grid 24. The wheel retainer arm is rotatable from a storage position parallel to and in front of the cross bar 20 as shown in FIG. 4 to a wheel retaining position transverse to the cross bar as shown in FIG. 6. The arm 44 also may be held or locked in a wheel approach position intermediate the storage and wheel retaining positions as shown in FIG. 5. When in a wheel approach position, the arm is positioned to clear the outside of a wheel of a vehicle to be engaged.

The wheel retainer arm is rotatably connected to the wheel grid by vertical pin 46 extending through and welded to the arm adjacent its first or inner end and which extends through a top plate 56 in the wheel grid and is received in a bushing 48 attached to the bottom of plate 56 as shown in FIGS. 2 and 3. Vertical pin 46 is threaded at its bottom end to threadably receive a lock nut 50 thereon. The length of the thread on the pin is such that when the lock nut is fully tightened to the end of the thread, a small gap 52 on the order of one sixteenth of an inch is left between the lock nut and the bottom of the bushing 48. This small gap 52 permits the arm 44 to be freely rotated to a desired position. The arm 44 thus is normally permanently attached to the wheel grid so as to be non-removable. Moreover, the arm has a length which is fixed with respect to the wheel grid.

The outer end of the wheel grid includes flat top plate 56 having at least 3 holes 58 therein corresponding to the storage, wheel approach and wheel retaining positions of the wheel retainer arm 44. Additional holes may be provided in top plate 56 if further holding positions are desired for the wheel retainer arm 44. A pin 60 spring biased to an extended position extends through the arm 44 near its inner end to engage the holes 58. With this arrangement the wheel retainer arm 44 is rotatably connected to the wheel grid in a manner such that the arm 44 is positioned above the cross bar 20 and the wheel grid 24.

A removable wheel retainer pan 62 is mounted at the second or outer end of wheel retainer arm 44 as shown in FIGS. 2 and 3. The wheel retainer pan is comprised of a curved wheel contacting surface 64 attached to an inverted L-shaped bracket 66 having 2 collared holes 68 on its horizontal upper surface thereof and a single hole 70 in its vertical side. The outer end of the arm 44 is provided with 2 vertical rods or projections 69 for insertion in the holes 68 and a horizontal cam pin 71 spring biased to an extended position to engage hole 70 when the wheel retainer pan is mounted on the arm 44.

Having the wheel retainer pan easily removable is advantageous in that it allows ready removal of the pan to allow just the retainer arm to horizontally rotate above an obstacle such as a curb.

As shown by the arrows 72 in FIGS. 5 and 6, each wheel retainer arm 44 may be rotated horizontally outwardly from a storage position parallel to and in front of the cross bar 20 to a wheel approach position wherein the wheel retainer pan clears the outside of a wheel and then to a wheel retaining position wherein the arm is adjacent the outside of a wheel.

In operation of the wheel lift device of the present invention as shown in FIGS. 1, 4, 5 and 6, the boom and the wheel 74 retainer assembly are extended and lowered and the towing vehicle positioned so that the wheel retainer assembly is close to the wheels 74 of a vehicle to be towed. When backing up the towing vehicle, the wheel retainer pans while in a storage position may be used as sight guides through the rear window of the vehicle to get closely positioned at the center of the vehicle to be towed. The wheel chocks are then adjusted to fit the size of the wheel. The wheel lift device is then lowered closer to the ground and the wheel grids are adjusted to the proper track width of the vehicle to be towed.

The wheel retainer arms are then rotated to the wheel approach position shown in FIG. 5 and locked in place. The wheel lift assembly is then extended until the wheel chocks engage the wheels 74 of the vehicle. The wheel retainer arms are then released and fully rotated into a wheel retaining position to also engage the wheels 74 of a vehicle as shown in FIG. 6 and locked in that position. Thereafter the wheel lift assembly may be raised, safety straps put around the tires and the vehicle towed.

Numerous other modifications and adaptations of the present invention will be apparent to those skilled in the art and thus, it is intended by the following claims to cover all such modifications and adaptations which fall within the true spirit and scope of the invention.

I claim:

1. A wheel lift vehicle lifting and towing device for attachment to a towing vehicle comprising:

a boom for mounting to a towing vehicle;

a cross bar connected to a rear end of said boom;

a wheel retainer assembly mounted adjacent each end of said cross bar;

each said wheel retainer assembly comprising:

a wheel grid mounted on an end of said cross bar and including a wheel chock transversely adjustable with respect to said wheel grid;

a wheel retainer arm rotatably mounted adjacent a first end thereof to an outer end of said wheel grid and positioned above said wheel grid, said wheel retainer arm being non removable and having a length which is fixed with respect to said wheel grid, said wheel retainer arm being horizontally rotatable from a position outside a vehicle wheel to a wheel retaining position adjacent the outside of the vehicle wheel; and a wheel retaining member mounted transversely to and adjacent a second end of said wheel retainer arm and cooperating with said wheel chock to retain a wheel therebetween.

2. A wheel lift device according to claim 1 wherein said wheel retaining member is a wheel retaining pan which is removably attached to said wheel retainer arm.

3. A wheel lift device according to claim 1 wherein said wheel retainer arm is rotatable outwardly from a storage position parallel to and in front of said cross bar to said wheel retaining position transverse to said cross bar.

4. A wheel lift device according to claim 1 wherein said wheel grid is laterally adjustable along said cross bar.

5. A wheel lift vehicle lifting and towing device for attachment to a towing vehicle comprising:

a boom for mounting to a towing vehicle;

a cross bar connected to a rear end of said boom;

a wheel retainer assembly mounted adjacent each end of said cross bar;

each said wheel retainer assembly comprising:

a laterally adjustable wheel grid mounted on an end of said cross bar and including a wheel chock transversely adjustable with respect to said wheel grid;

a wheel retainer arm rotatably mounted adjacent a first end thereof to an outer end of said wheel grid and positioned above said wheel grid, said wheel retainer arm being non removable and having a length which is fixed with respect to said wheel grid, said wheel retainer arm being horizontally rotatable outwardly from a storage position parallel to and in front of said cross bar to a wheel retaining position transverse to said cross bar; and a wheel retaining pan mounted transversely to and adjacent a second end of said wheel retainer arm and cooperating with said wheel chock to retain a wheel therebetween, said wheel retaining pan being removably attached to said wheel retainer arm.

6. A wheel lift vehicle lifting and towing device for attachment to a towing vehicle comprising:

a boom for mounting to a towing vehicle;

a cross bar connected to a rear end of said boom;

a wheel retainer assembly mounted adjacent each end of said cross bar;

each said wheel retainer assembly comprising:

a wheel grid mounted on an end of said cross bar;

a wheel retainer arm rotatably mounted adjacent a first end thereof to an outer end of said wheel grid, said wheel retainer arm being positioned above said wheel grid and horizontally rotatable to a wheel retaining position adjacent a vehicle wheel, said wheel retainer arm being non removable and having a length which is fixed with respect to said wheel grid;

means for rotatably mounting said wheel retainer arm to an outer end of said wheel grid, said means for rotatably mounting said wheel retainer arm comprising a vertical pin extending sequentially through said wheel retainer arm and said wheel grid; and a wheel retaining member mounted adjacent a second end of said wheel retainer arm and cooperating with said wheel grid to retain a wheel therebetween.

7. A wheel lift device according to claim 6 wherein said wheel grid includes a wheel chock transversely adjustable with respect to said wheel grid.

8. A wheel lift vehicle lifting and towing device for attachment to a towing vehicle comprising:

a boom for mounting to a towing vehicle;

a cross bar connected to a rear end of said boom;

a wheel retainer assembly mounted adjacent each end of said cross bar;

each said wheel retainer assembly comprising:

a wheel grid mounted on an end of said cross bar and including a wheel chock transversely adjustable with respect to said wheel grid;

a wheel retainer arm rotatably mounted adjacent a first end thereof to an outer end of said wheel grid, said wheel retainer arm being horizontally rotatable outwardly from a storage position parallel to and in front of said cross bar to a wheel retaining position adjacent the outside of the vehicle wheel and transverse to said cross bar;

means for holding said wheel retainer arm in a wheel approach position intermediate said storage position and said wheel retaining position; and a wheel retaining member mounted transversely to and adjacent a second end of said wheel retainer arm and cooperating with said wheel chock to retain a wheel therebetween.

9. A wheel lift vehicle lifting and towing device for attachment to a towing vehicle comprising:

a boom for mounting to a towing vehicle;

a cross bar connected to a rear end of said boom;

a wheel retainer assembly mounted adjacent each end of said cross bar;

each said wheel retainer assembly comprising:

a laterally adjustable wheel grid mounted on an end of said cross bar and including a wheel chock transversely adjustable with respect to said wheel grid;

a wheel retainer arm rotatably mounted adjacent a first end thereof to an outer end of said wheel grid, said wheel retainer arm being horizontally rotatable outwardly from a storage position parallel to and in front of said cross bar to a wheel retaining position transverse to said cross bar;

means for holding said wheel retainer arm in a wheel approach position intermediate said storage position and said wheel retaining position; and a wheel retaining pan mounted transversely to and adjacent a second end of said wheel retainer arm and cooperating with said wheel chock to retain a wheel therebetween, said wheel retaining pan being removably attached to said wheel retainer arm.

10. A wheel lift device according to claim 9 wherein said means for holding said wheel retainer arm comprises a spring biased pin on said arm and cooperating positioning holes in said wheel grid.

11. A wheel lift vehicle lifting and towing device for attachment to a towing vehicle comprising:

a boom for mounting to a towing vehicle;

a cross bar connected to a rear end of said boom;

a wheel retainer assembly mounted adjacent each end of said cross bar;

each said wheel retainer assembly comprising:

a laterally adjustable wheel grid mounted on an end of said cross bar and including a wheel chock transversely adjustable with respect to said wheel grid;

a wheel retainer arm rotatably mounted adjacent a first end thereof to an outer end of said wheel grid, said wheel retainer arm being horizontally rotatable outwardly from a storage position parallel to and in front of said cross bar to a wheel retaining position transverse to said cross bar;

a wheel retaining pan mounted transversely to and adjacent a second end of said wheel retainer arm and cooperating with said wheel chock to retain a wheel therebetween, said wheel retaining pan being removably attached to said wheel retainer arm; and a spring biased pin and projections on said retainer arm and cooperating openings in said wheel retaining pan for removably attaching said wheel retaining pan to said wheel retainer arm.

* * * * *